(12) United States Patent
Fitzgerald et al.

(10) Patent No.: US 10,785,069 B2
(45) Date of Patent: Sep. 22, 2020

(54) EARLY DETECTION AND INDICATION OF LINK LOSS

(71) Applicant: Analog Devices International Unlimited Company, Limerick (IE)

(72) Inventors: Niall Fitzgerald, Dublin (IE); Oisín Ó Cuanacháin, Dublin (IE)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/684,257

(22) Filed: Nov. 14, 2019

(65) Prior Publication Data

US 2020/0186396 A1    Jun. 11, 2020

Related U.S. Application Data

(60) Provisional application No. 62/776,533, filed on Dec. 7, 2018.

(51) Int. Cl.
| | |
|---|---|
| *H04L 25/08* | (2006.01) |
| *H04L 25/03* | (2006.01) |
| *H04B 1/3822* | (2015.01) |
| *H04L 27/01* | (2006.01) |
| *H04L 7/00* | (2006.01) |

(52) U.S. Cl.
CPC ..... *H04L 25/03057* (2013.01); *H04B 1/3822* (2013.01); *H04L 7/0062* (2013.01); *H04L 25/03343* (2013.01); *H04L 25/03885* (2013.01); *H04L 27/01* (2013.01); *H04L 2025/0349* (2013.01)

(58) Field of Classification Search
CPC ......... H04L 25/03057; H04L 25/03885; H04L 25/03343; H04L 7/0062; H04L 27/01; H04L 2025/0349; H04B 2025/0349
See application file for complete search history.

(56) References Cited

U.S. PATENT DOCUMENTS

| | | | |
|---|---|---|---|
| 3,292,110 A | 12/1966 | Becker et al. | |
| 4,580,275 A | 4/1986 | Pirani et al. | |
| 4,752,943 A | 6/1988 | Martinez et al. | |

(Continued)

FOREIGN PATENT DOCUMENTS

| | | |
|---|---|---|
| CN | 102655442 B | 1/2015 |
| KR | 10556403 B1 | 3/2006 |
| WO | WO-2016058176 A1 | 4/2016 |

*Primary Examiner* — Siu M Lee
(74) *Attorney, Agent, or Firm* — Schwegman Lundberg & Woessner, P.A.

(57) ABSTRACT

This disclosure describes techniques for detecting link loss in a physical layer receiver of a communication system. The system includes a slicer coupled to receive, at a slicer input, a signal from a channel equalizer and map the signal to a physical coding sublayer (PCS) level at a slicer output and processor coupled to at least one of the slicer input or the slicer output. The processor is configured to analyze a window of consecutive samples at the at least one of the slicer input or the slicer output over a time window; increment a counter as a function of the window of consecutive samples at the at least one of the slicer input or the slicer output; compare the counter to a threshold; and generate a signal indicating link loss in response to determining that the counter corresponds to the threshold independently of a timer.

20 Claims, 12 Drawing Sheets

(56) References Cited

U.S. PATENT DOCUMENTS

| | | |
|---|---|---|
| 6,246,722 B1 | 6/2001 | Velez et al. |
| 6,487,243 B1 | 11/2002 | Hwang et al. |
| 6,553,518 B1 | 4/2003 | Ware et al. |
| 6,661,837 B1 | 12/2003 | Abdelilah Youssef et al. |
| 7,254,194 B2 | 8/2007 | Lin et al. |
| 8,320,411 B1 | 11/2012 | Sedarat et al. |
| 8,885,695 B1 | 11/2014 | Kang et al. |
| 8,953,665 B2 | 2/2015 | Sindalovsky et al. |
| 8,958,512 B1 | 2/2015 | Ding et al. |
| 2005/0175080 A1 | 8/2005 | Bouillett |
| 2015/0105066 A1* | 4/2015 | Wu ................ H04W 76/27 455/423 |
| 2015/0326348 A1 | 11/2015 | Shen et al. |
| 2015/0350932 A1* | 12/2015 | Da Silva ......... H04W 36/0083 370/225 |
| 2016/0183103 A1* | 6/2016 | Saily ............... H04W 36/0069 370/216 |
| 2017/0055166 A1* | 2/2017 | Shi .................. H04L 5/0032 |
| 2017/0279599 A1 | 9/2017 | Yilmazer et al. |
| 2017/0311189 A1* | 10/2017 | Almalfouh ....... H04W 56/0035 |
| 2018/0183629 A1 | 6/2018 | Pandey |
| 2019/0058503 A1* | 2/2019 | Jain ................. H04B 3/32 |
| 2019/0173740 A1* | 6/2019 | Zhang .............. H04W 72/042 |

\* cited by examiner

EARLY DETECTION AND INDICATION OF LINK LOSS

CROSS-REFERENCE TO RELATED APPLICATION

This application claims the benefit of priority of U.S. Provisional Patent Application No. 62/776,533, entitled "EARLY DETECTION AND INDICATION OF LINK LOSS," filed on Dec. 7, 2018, the entirety of which is hereby incorporated by reference herein.

FIELD OF THE DISCLOSURE

This document pertains generally, but not by way of limitation, to link loss detection in a physical layer (PHY) of a communication system.

BACKGROUND

Industrial and mission-critical networking applications frequently require early notice of link loss events from a PHY device in order to switch over to using standby, redundant links. The PHY device's purpose is typically to establish and maintain the link. A PHY device is typically not designed to drop the link at the first sign of trouble or loss in communications. Rather the PHY device typically waits and observes the loss in communication for some time to determine whether the issue is persistent. At that point, the PHY device performs a link retrain to attempt to salvage the link and re-establish communications before indicating to higher levels or other devices that the link is down (e.g., the loss in communications). Some systems, though, need earlier indications of potential communications loss in order to switch or fail over to redundant or other links.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
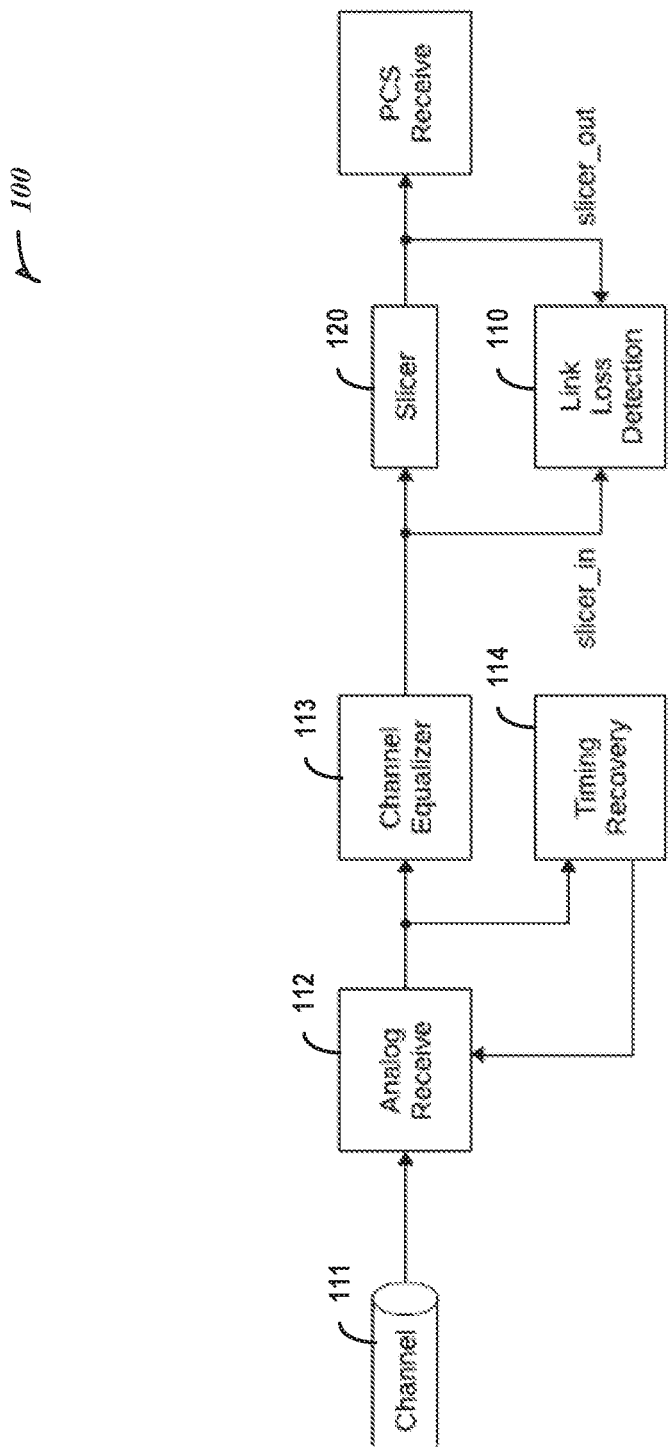
FIG. 1 is a block diagram of an example of a half-duplex communications system employing a link loss detection module, in accordance with various embodiments.

This disclosure describes, among other things, techniques to detect a link loss at a PHY receiver by analyzing input/output samples of a PHY device slicer. This disclosure describes a link loss detection module that includes one or more processors (processing circuitries) that analyze the input or output samples at a slicer and generate a signal indicating link loss when certain conditions are met. Specifically, a slicer at the PHY receiver is coupled to receive, at a slicer input, a digital signal from a channel equalizer and map the digital signal to a physical coding sublayer (PCS) level at a slicer output. A processor (e.g., included in the link loss detection module) is coupled to at least one of the slicer input or the slicer output and is configured to analyze a window of consecutive samples at the at least one of the slicer input or the slicer output over a time window. The processor adjusts a counter based on one or more of the consecutive samples and compares the counter to a threshold. The processor generates a signal indicating link loss in response to determining that the counter corresponds to the threshold independently of a timer.

Typically, after a link is established between two devices, the PHY receivers enter a state in which the PHY receivers are idle or send/receive data. In this state, the status of the PHY receivers is monitored. If the PHY receiver is determined to be in a failed state (e.g., a local receiver status signal indicates that the receiver is not OK), the PHY receiver automatically enters a retrain state to re-establish a link. In parallel, a link monitor starts a maximum wait timer when the PHY receiver is determined to be in the failed state and brings down the link indicating that the link has failed after the maximum wait timer expires if the PHY receiver continues to be in the failed state. This allows the PHY receiver to bring the link back up in the retrain state within the maximum wait timer period. Namely, if the PHY receiver is able to re-establish the link after the PHY receiver fails, then the link monitor will not bring the link down.

While such prior approaches generally work well, in certain situations, the PHY receiver may not be able to re-establish the link in the retrain state and it is not until the maximum wait timer expires that the link monitor indicates that the link has failed by bringing down the link. This results in a significant delay between when the PHY receiver has been determined to be in a failed state and when the link monitor indicates that the link has failed. Due to this delay, higher level applications may delay addressing the link failure early enough to avoid errors.

In order to improve the efficiencies of the system and provide immediate link loss indications to higher level applications, the disclosed embodiments generate the signal indicating link loss without waiting for a timer to expire. This link loss signal is generated as soon as the PHY receiver is determined to be in a failed state. The failed state of the PHY receiver is determined when conditions of digital samples at the input or output of the slicer in the PHY receiver meet certain criteria. In certain embodiments, a retrain enable signal is used to determine whether to activate the indication of the link loss signal independently of the timer. Namely, when the retrain signal is enabled, the disclosed embodiments operate to provide the link loss signal after waiting for the timer to expire while the PHY receiver attempts to re-establish the link in a retraining state. However, when the retrain signal is disabled, the disclosed embodiments operate to provide the link loss signal immediately when the PHY receiver is determined to be in a failed state and without allowing the PHY receiver to enter the retraining state to re-establish the link. In such cases, the PHY receiver enters the retraining state only in response to a higher-level application resetting the PHY receiver.

According to the disclosed embodiments, the slicer in the PHY receiver generates a PCS signal that includes three levels (although any number of more or less levels can be provided) and is configured to map the digital signal to one of the three levels (or more or less levels). According to the disclosed embodiments, the processor analyzes three different conditions for generating the signal indicating link loss. These conditions include a near zero detection event in which a predetermined number of consecutive samples are all within range of a zero PCS level; an invalid level detection event in which a predetermined number of consecutive samples are within range of a zero PCS level or exceed a 1 or –1 PCS level by a predetermined amount; and a stuck detection event in which a predetermined number of consecutive samples are at a particular PCS level (e.g., 1 or –1).

According to the disclosed embodiments, the signal indicating link loss comprises a near zero detection event signal and the threshold is zero. In such cases, the processor initializes the counter and, for each of the consecutive samples at the slicer input, computes an absolute value of a given sample of the consecutive samples at the slicer input. The processor further compares the computed absolute value of the given sample to a near zero detection level. The processor decrements the counter in response to determining that the computed absolute value of the given sample is less than or equal to the near zero detection level. The processor generates the signal indicating link loss in response to the counter matching the threshold independently of a timer.

According to the disclosed embodiments, the signal indicating link loss comprises an invalid level detection event signal. In such cases, the processor initializes the counter and, for each of the consecutive samples at the slicer input, computes an absolute value of a difference between a value of the given sample of the consecutive samples at the slicer input and a value of the given sample at the slicer output. The processor compares the computed absolute value of the given sample to an invalid detection level. The processor increments the counter in response to determining that the computed absolute value of the given sample is greater than the invalid detection level. The processor generates the signal indicating link loss in response to the counter exceeding the threshold independently of a timer.

According to the disclosed embodiments, the signal indicating link loss comprises a stuck detection event signal and the threshold is zero. In such cases, the processor initializes the counter and, for each of the consecutive samples at the slicer input, determines whether two adjacent ones of the consecutive samples at the slicer output are equal to each other. The processor decrements the counter in response to determining that the two adjacent ones of the consecutive samples at the slicer output are equal to each other. The processor generates the signal indicating link loss in response to the counter matching the threshold independently of a timer.

FIG. 1 is a block diagram of an example of a half-duplex communications system 100 employing a link loss detection module, in accordance with various embodiments. The half-duplex communications system 100 includes a channel 111, analog receiver 112, channel equalizer 113, timing recovery circuitry 114, a slicer 120, a link loss detection module 110, and a PCS receiver.

Each network controller in communications system 100 includes a respective PHY circuitry configured to interface nodes over a channel (e.g., a communications link). A PHY circuitry may comply or be compatible with an Institute of Electrical and Electronic Engineers (IEEE) 802.3™ Ethernet communications protocol. As used herein, "Ethernet PHY" corresponds to PHY circuitry (e.g., PHY circuitry, device, or receiver) that complies and/or is compatible with one or more IEEE 802.3™ Ethernet communications protocols. The IEEE 802.3™ Ethernet communication protocol may include, for example, single-lane PHY protocols such as 10GBASE-KX, 100BASE-TX, 1000BASE-T, 10GBASE-KR, and the like, and/or multi-lane PHY protocols such as 10GBASE-KX4, 40GBASE-KR4, 40GBASE-CR4, 100GBASE-CR10, 100GBASE-CR4, 100GBASE-KR4, and/or 100GBASE-KP4, and the like, and/or other PHY circuitry that is compliant with the IEEE 802.3™ Ethernet communications protocol and/or compliant with an after-developed communications protocol and/or emerging PHY technology specifications such as 25GBASE-CR and/or 25GBASE-KR, and the like.

Each PHY circuitry includes a respective transmit circuitry and a respective receive circuitry and is configured to transmit data packets and/or frames to a remote device over a channel. Receive circuitry is configured to receive data packets and/or frames from another device over the channel. Each PHY circuitry may include an analog receiver 112, which includes encoding/decoding circuitry (not shown) configured to perform analog-to-digital and digital-to-analog conversion, encoding and decoding of data, analog parasitic cancellation (for example, cross talk cancellation), and recovery of received data.

The channel equalizer 113, in combination with the analog receiver 112, generates a multi-bit representation of a received analog input signal. Namely, the channel equalizer 113 outputs multiple samples, with each sample having multiple bits of digital data.

Slicer 120 is configured to receive a digital signal and to provide a differential slicer output such as a PCS level. For example, slicer 120 may receive a multi-bit digital sample at its input and may map the multi-bit digital sample to one of multiple levels (e.g., three levels, –1, 0, 1). The slicer 120 may output the corresponding level of each multi-bit digital sample. Slicer 120 may operate in accordance with conventional principles to produce a decision symbol and a slicer error signal as output signals.

Link loss detection module 110 is coupled to the input and output of the slicer 120. The link loss detection module 110 analyzes windows of the input and/or output samples of the slicer 120 to determine whether the samples meet certain conditions. The condition(s) analyzed by the link loss detection module 110 are programmable and selectable by storing certain bit values in registers. For example, when a first condition is selected to be monitored, the link loss detection module 110 determines whether a near zero detection event occurs (e.g., that the first condition is satisfied) in which a predetermined number of consecutive samples are all within range of a zero PCS level. As another example, when a second condition is selected to be monitored, the link loss detection module determines whether an invalid level detection event occurs (e.g., that the second condition is satisfied) in which a predetermined number of consecutive samples are within range of a zero PCS level or exceed a 1 or –1 PCS level by a predetermined amount. As another example, when a third condition is selected to be monitored, the link loss detection module 110 determines whether a stuck detection event occurs (e.g., that the third condition is satisfied) in which a predetermined number of consecutive samples are at a particular PCS level (e.g., 1 or –1). Presence of any of these conditions indicates that the PHY receiver is in a failed state. In such circumstances, the link loss detection module 110 generates an indication that the PHY receiver is in a failed state and/or generates a signal to cause the link monitor to output a failed link status without waiting for a maximum wait timer to expire (e.g., independently of the maximum wait timer of the link monitor).

Figure 2:
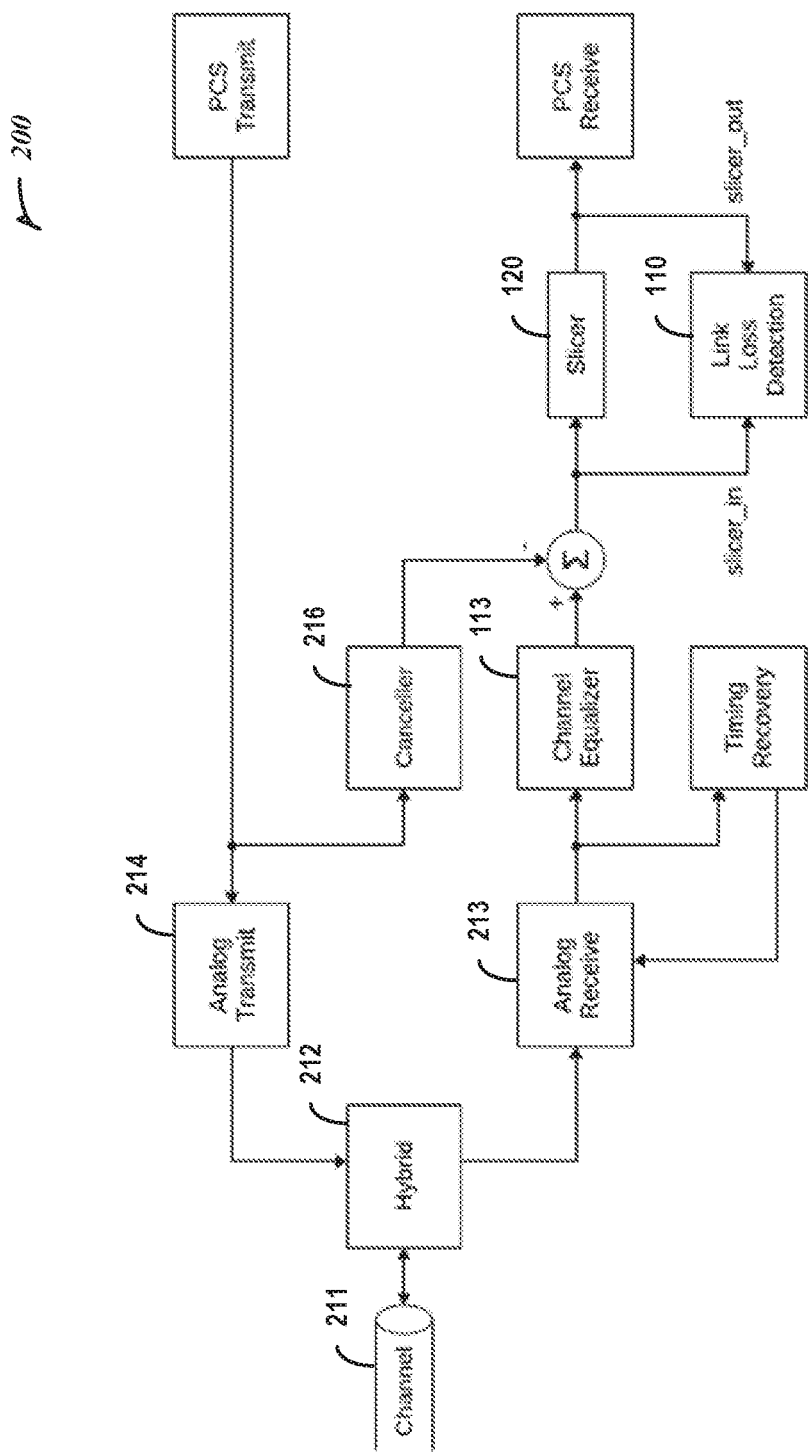
FIG. 2 is a block diagram of an example of a full-duplex communications system employing a link loss detection module, in accordance with various embodiments.

FIG. 2 is a block diagram of an example of a full-duplex communications system 200 employing a link loss detection module, in accordance with various embodiments. The full-duplex communications system 200 includes a channel 211, a hybrid transmit and receive device 212, an analog receiver 213, an analog transmitter 214, a PCS transmitter device, a canceller module 216, channel equalizer 113, timing recovery circuitry, a slicer 120, a link loss detection module 110, and a PCS receiver. In general, full-duplex communications system 200 includes all the same components as half-duplex communications system 100 except system 200 also includes transmission components. Communications system 200 illustrates a PHY receiver for a PHY technology where the same channel is used for both transmit and receive signaling (e.g. 1000BASE-T), and the PHY is configured to actively cancel interference effects due to local PHY transmission.

The function of the canceller module 216 here is to cancel interference due to local PHY device transmission, e.g., primarily local echo but also near-end crosstalk (due to local transmission on other dimensions in multi-dimensional PHY technologies).

For purposes of this disclosure, the link loss detection module 110 is discussed with respect to a PHY receiver in system 100 but operates in a similar manner as link loss detection module 110 in a PHY receiver/transmitter device of communications system 200.

Specifically, FIG. 1 shows a simplified overview of a PHY receiver for a PHY technology where the receive channel is separate from the transmit channel (e.g. 100BASE-TX), (e.g., where the interference due to local PHY transmission can be regarded as negligible). The PHY receiver is configured to stay synchronized with the remote PHY transmission using the timing recovery circuit, as well as to undo channel distortion using the channel equalizer. The signal output of the channel equalizer 113 is configured to match, with some imperfection (e.g., due to noise sources, timing jitter, incomplete channel equalization), the PCS transmit signal of the remote PHY device. If the PHY receiver is functioning properly, the magnitude of the imperfection will be small, and the signal samples at the channel equalizer output will fall within narrow bands around the transmit signal levels (an 'open eye'). The multi-bit digital samples output by channel equalizer 113 constitute the input to the slicer 120, which maps this input signal to the exact PCS levels by applying decision levels halfway between these levels.

Figure 3:
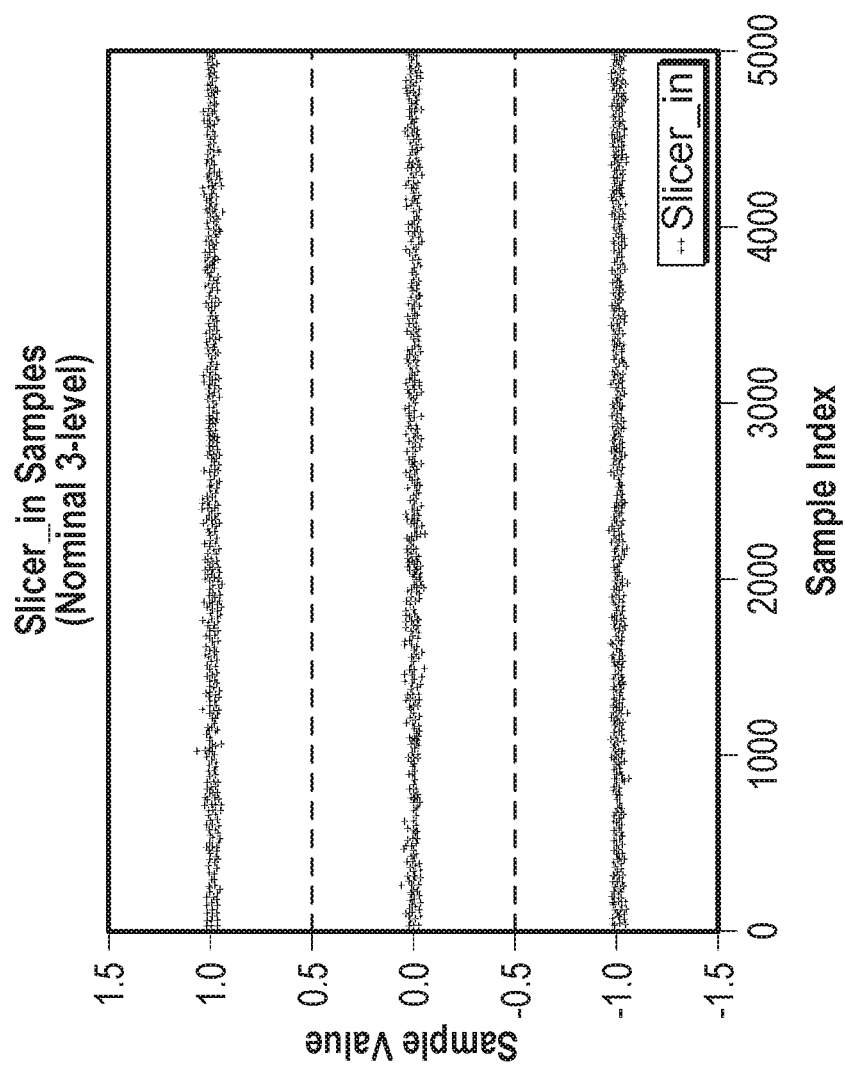
FIG. 3 is an illustrative three level slicer input signal, in accordance with various embodiments.

FIG. 3 is an illustrative three PCS level slicer input signal, in accordance with various embodiments. Although only three PCS levels are shown, any number of more or less levels can be provided in a similar manner. FIG. 3 shows the slicer input signal where the PHY receiver is functioning properly. In this case, three PCS signal levels, (−1, 0, +1), are used and the PHY receiver is successfully resolving these levels in the presence of various interference sources. The link loss detection module 110 is coupled to receive the input signal and/or the output signal of the slicer 120. The link loss detection module 110 analyzes samples on one or both of the input or output signal of slicer 120 and detects a link loss event (e.g., when an abrupt change occurs in the slicer input signal). An abrupt disruption to the channel between the local and remote PHY devices can affect the slicer input or output signal and results in significant deviation from the PCS signal levels shown in FIG. 3.

Figure 4A:
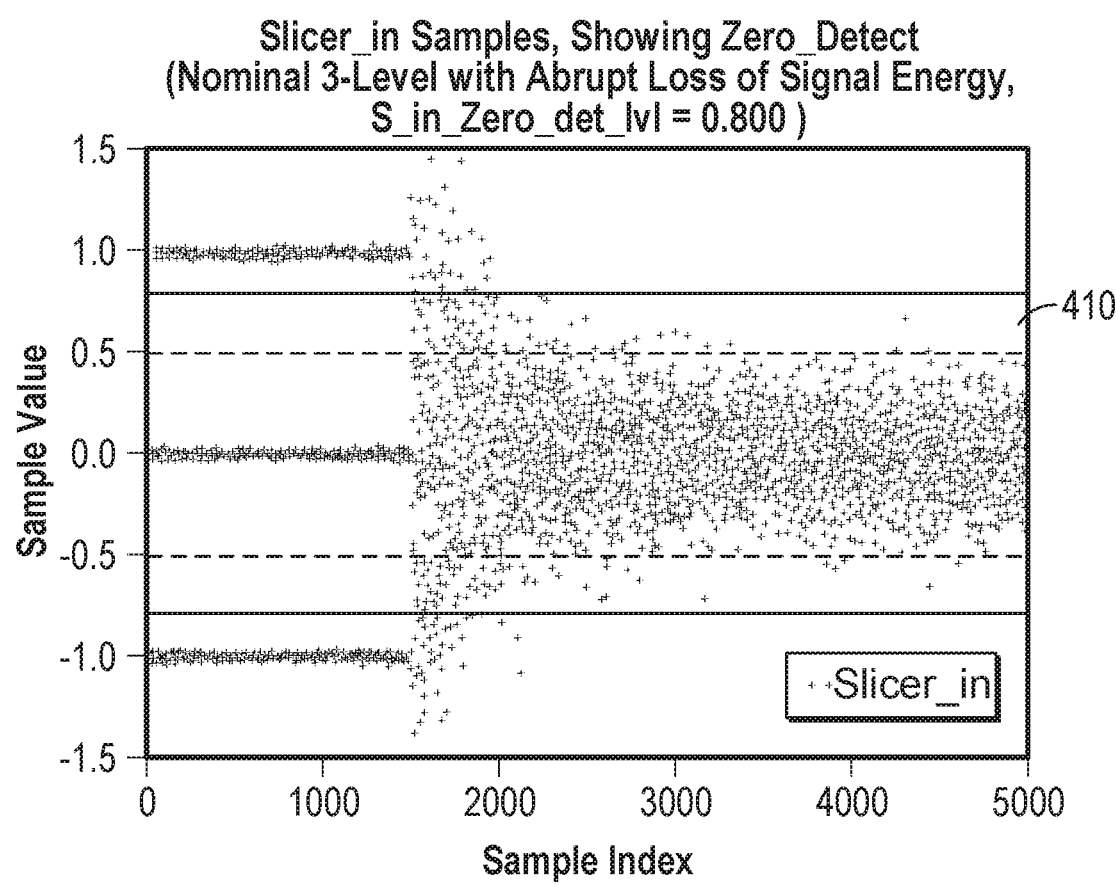
FIGS. 4a-c are illustrative three level slicer loss of signal conditions detected by the link loss detection module, in accordance with various embodiments.
Figure 4B:
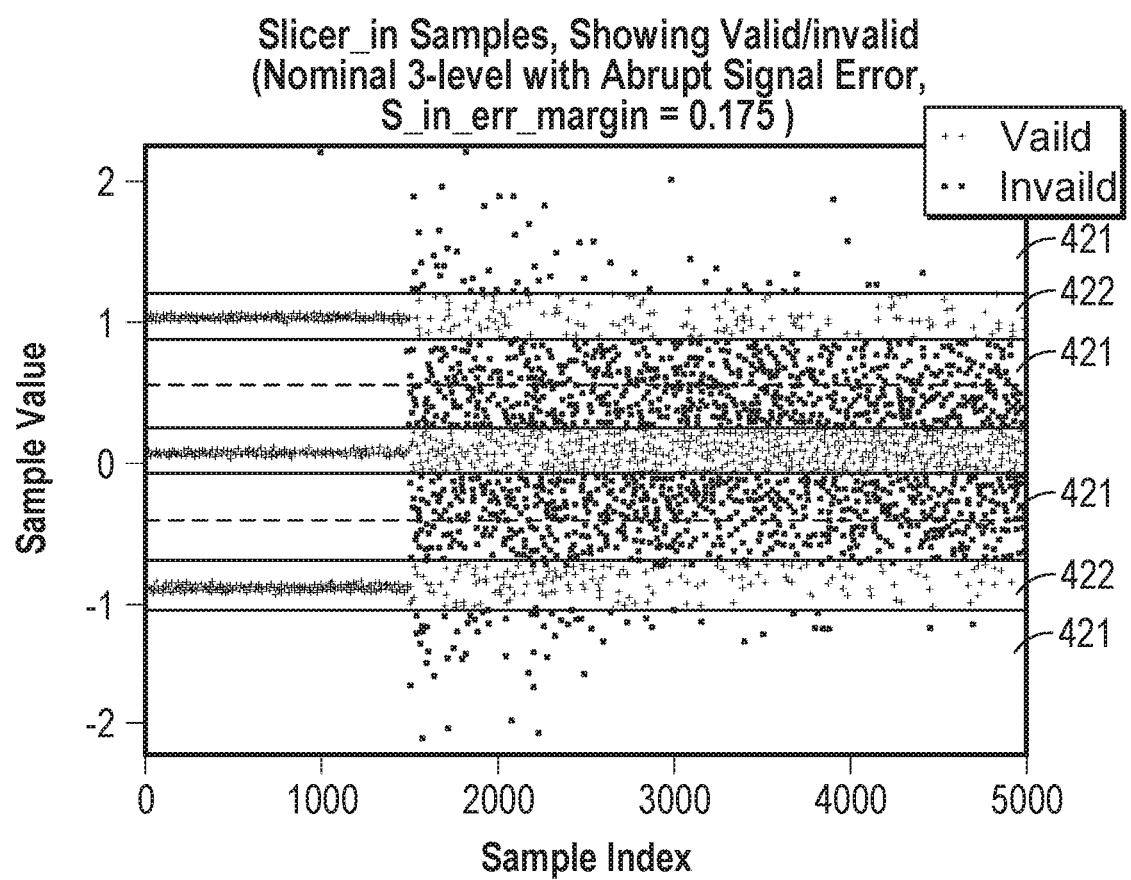
Figure 4C:
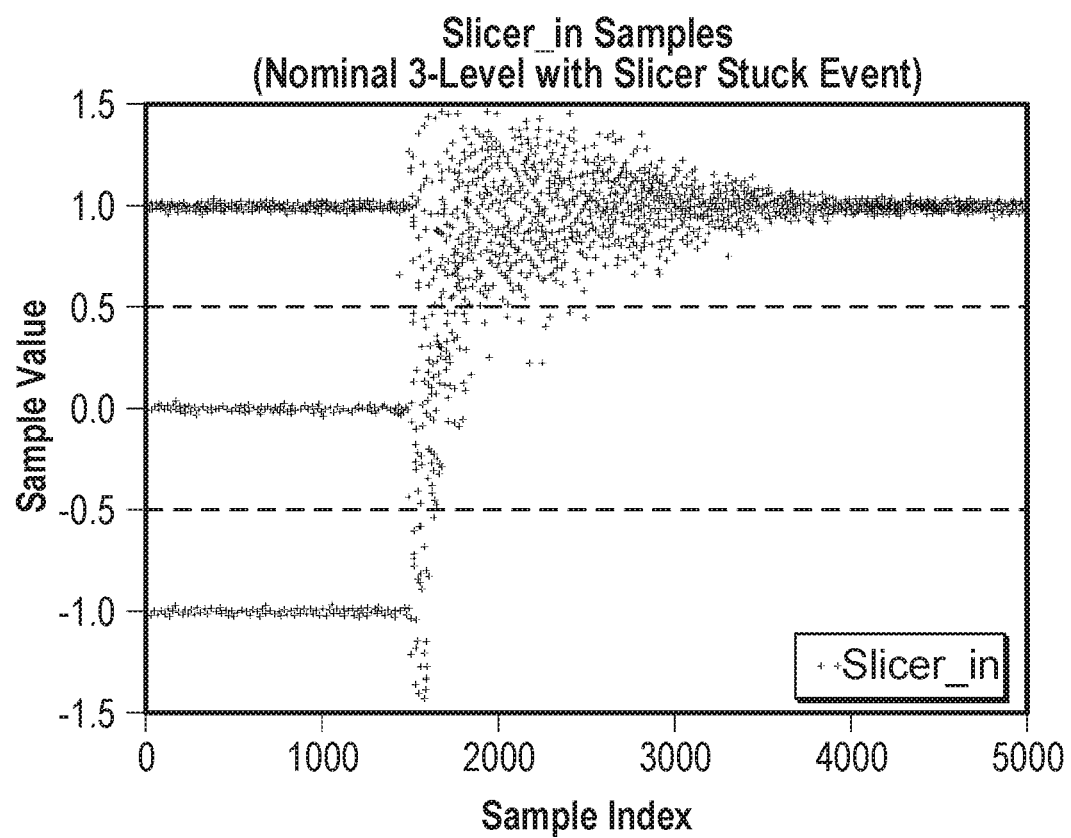

FIGS. 4a-c illustrate three different examples of abrupt changes in the input or output signals of the slicer 120 that are detected by the link loss detection module 110. Specifically, FIGS. 4a-c illustrate three conditions for input and/or output samples that the link loss detection module 110 monitors to determine if they are satisfied either individually or as a combination.

FIG. 4a illustrates a situation in which the PHY receiver slicer 120 input signal first resolves a three level signal, followed by abrupt channel disruption with signal degradation and reduction in signal amplitude. Specifically, FIG. 4a illustrates a first condition analyzed by the link loss detection module 110. FIG. 4a shows the slicer 120 input signal when a channel disruption introduces an abrupt error component and a reduction in overall signal amplitude. This scenario might be observed when a partial break is introduced to the channel (e.g., a wire in a cable is partially cut) for a half-duplex PHY as depicted above in communications system 100. The absolute values of the slicer input samples are analyzed by the link loss detection module 110 to detect such an event and to trigger generation of a link loss signal.

Specifically, if the absolute value of the slicer input remains low (less than a threshold value) for a window that includes a number of consecutive slicer input samples, then link loss detection module 110 generates a signal indicating a loss of link event. This detection function can be enabled by a programmable enable register (e.g., near_zero_det_en). When this register is enabled, link loss detection module 110 performs the process of detecting this condition by initializing a counter (e.g., setting the counter to a predetermined number of samples allowed to be near zero). Then, for each of the consecutive samples at the slicer 120 input within the window, the link loss detection module computes an absolute value of a given sample of the consecutive samples at the slicer input. The link loss detection module 110 compares the computed absolute value of the given sample to a near zero detection level and decrements the counter in response to determining that the computed absolute value of the given sample is less than or equal to the near zero detection level. The link loss detection module 110 generates the signal indicating link loss in response to the counter matching the threshold after a certain number of samples are analyzed. The link loss detection module 110 repeats this process and continuously monitors samples in a sliding window, where the counter is re-initialized for every new window of samples. In some embodiments, because the window is sliding, a certain number of samples from a previous window are analyzed again in the new window.

In some cases, this programmable enable register (e.g., near_zero_det_en) does not change dynamically; rather, it is set during PHY configuration, prior to establishment of the link, and would not be expected to change while the link is up. Namely, prior to establishing the link, the link loss detection module 110 is configured to monitor a certain number and combination of conditions. These conditions that are monitored may not change after establishing the link.

In some embodiments, the conditions can be changed dynamically, such that certain conditions that were not analyzed at one point when the link was established are analyzed at another point in time of the same established link. Namely, the detection function for detecting the condition shown in FIG. 4a can be enabled dynamically according to the value of another register (e.g., a near_zero_det_en)

and other link parameters, including link status and local receiver status (loc_rcvr_status), as follows:

near_zero_det_en_dyn=(near_zero_det_en)*(link_status=OK)*(loc_rcvr_status=OK)

For purposes of this disclosure, the '*' operator represents a logical AND operation. The purpose of including loc_rcvr_status (a register indicating that the PHY receiver is properly operating and communicating) is to handle Low Power Idle (LPI) mode, where 0 levels would be expected for the slicer input samples during the LPI QUIET state of the LPI mode.

A slicer_in_near_zero$_n$ indication can then be generated by the link loss detection module 110 in accordance with the following:

slicer_in_near_zero$_n$ is set to FALSE if near_zero_det_en_dyn=FALSE;

slicer_in_near_zero$_n$ is set to TRUE else if |slicer_in$_n$|≤near_zero_det_lvl; and slicer_in_near_zero$_n$ is set to FALSE else (|slicer_in$_n$|>near_zero_det_lvl).

Here the absolute value of the slicer 120 input sample is compared against a programmable level (e.g., a near_zero_det_lvl), which can be set during PHY device configuration, prior to establishment of the link. The slicer 120 input signal levels that would be determined by the link loss detection module 110 as 'near zero' are highlighted in 410 and this range is defined by the near_zero_det_lvl value.

This detection function of the link loss detection module 110 analyzes a window of a number n consecutive slicer input samples for which slicer_in_near_zero$_n$ is TRUE. The size of the window of samples of consecutive slicer 120 input samples can be set by a programmable register value (e.g., near_zero_det_nsmpl). The size of the sample window that is analyzed (e.g., the value of near_zero_det_nsmpl) may take into account the maximum possible number of consecutive zeros due to the coding scheme used by the PHY standard.

Counting a number of consecutive slicer input samples within the window can be achieved by a decrementing counter, near_zero_det_cntr$_n$, as follows:

near_zero_det_cntr$_n$=near_zero_det_nsmpl if near_zero_det_en_dyn=FALSE;

near_zero_det_cntr$_n$=near_zero_det_cntr$_{n-1}$−1 else if slicer_in_near_zero$_n$=TRUE; and near_zero_det_cntr$_n$=near_zero_det_nsmpl else (slicer_in_near_zero$_n$=FALSE).

Particularly, the counter is initialized to the number of programmable samples near_zero_det_nsmpl. The counter is decremented by link loss detection module 110 for any sample in a window of samples for which the absolute value is less than or equal to the predetermined value near_zero_det_lvl. If the counter reaches a zero value within the range of samples in the window, the link loss detection module 110 generates the near zero detection event signal and sets a near_zero_det$_n$ indication signal to true.

FIG. 4b illustrates a situation in which the PHY receiver slicer 120 input signal first resolves a three level signal, followed by abrupt channel disruption with large signal degradation. Specifically, FIG. 4b illustrates a second condition analyzed by the link loss detection module 110. FIG. 4b shows the slicer 120 input signal when a channel disruption introduces a large and abrupt error component. This scenario may be detected by the link loss detection module 110 when a partial break is introduced to the channel (e.g. a wire in a cable is partially cut) for a full-duplex PHY as depicted in communications system 200. The channel disruption here can incur a significant change in the echo due to local transmission, and the canceller may not be able to adapt to this change instantly.

The link loss detection module 110 detects this event based on categorizing slicer input samples as valid or invalid based on the magnitude of the slicer error, (e.g., the difference between the slicer input and output) according to the following:

slicer_err$_n$=|slicer_out$_n$−slicer_in$_n$|

This detection function can be enabled by a programmable enable register, invalid_det_en. This may not change dynamically; rather, it can be set during PHY configuration, prior to establishment of the link, and would not be expected to change while the link is up. When this register is enabled, link loss detection module 110 performs the process of detecting this condition by initializing a counter (e.g., setting the counter to zero) and, for each of the consecutive samples in a window at the slicer input, computing an absolute value of a difference between a value of the given sample of the consecutive samples at the slicer input and a value of the given sample at the slicer output. The link loss detection module 110 compares the computed absolute value of the given sample to an invalid detection level and increments the counter in response to determining that the computed absolute value of the given sample is greater than the invalid detection level. The link loss detection module 110 generates the signal (e.g., slicer_in_invalid$_n$) indicating link loss in response to the counter exceeding the threshold after the window of sample are analyzed. The link loss detection module 110 repeats this process and continuously monitors samples in a sliding window, where the counter is re-initialized for every new window of samples. In some embodiments, because the window is sliding, a certain number of samples from a previous window are analyzed again in the new window.

In some cases, this programmable enable register (e.g., invalid_det_en) does not change dynamically; rather, it is set during PHY configuration, prior to establishment of the link, and would not be expected to change while the link is up. Namely, prior to establishing the link, the link loss detection module 110 is configured to monitor a certain number and combination of conditions. These conditions that are monitored may not change after establishing the link.

In some embodiments, the detection function can be enabled dynamically (after the link is established) according to the value of invalid_det_en and other link parameters, including link status and local receiver status, as follows:

invalid_det_en_dyn=invalid_det_en*(link_status=OK)*(loc_rcvr_status=OK).

The purpose of including loc_rcvr_status here is to handle LPI mode, where 0 levels would be expected for the slicer input samples during LPI QUIET.

The link loss detection module 110 can generate a slicer_in_invalid$_n$ indication as follows:

slicer_in_invalid$_n$=FALSE if invalid_det_en_dyn=FALSE;

slicer_in_invalid$_n$=TRUE else if slicer_err$_n$>invalid_det_lvl; and slicer_in_invalid=FALSE else (slicer_err$_n$≤invalid_det_lvl).

Specifically, the link loss detection module 110 compares the absolute value of the slicer input sample against a programmable level, invalid_det_lvl, which can be set during PHY configuration, prior to establishment of the link. The sample values that result in setting the slicer in_invalid$_n$ to TRUE are shown by region 421 and valid samples are shown in region 422. This detection function counts invalid slicer input samples within a window of consecutive samples, and a link loss signal is generated if the number of invalid slicer inputs samples within any window exceeds a programmable threshold number of invalid samples.

In some embodiments, a pair of counters can be implemented by link loss detection module 110 to analyze the window of samples to generate the slicer_in_invalid$_n$ indication signal. For example, a window counter, win_cntr$_n$, can be provided to count consecutive slicer input samples to mark the window, and an invalid sample counter, invalid_det_cntr$_n$, can be provided to count invalid slicer input samples within the window defined by win_cntr$_n$.

The window counter can be implemented with a decrementing counter as follows:

win_cntr$_n$=invalid_det_win_len if invalid_det_en_dyn=FALSE;

win_cntr$_n$=invalid_det_win_len else if win_cntr$_n$=1; and win_cntr$_n$=win_cntr$_{n-1}$−1 else.

Specifically, the window counter is set to an initial value of invalid_det_win_len and is decremented as each sample is analyzed within a window until reaching a given value of 1. The invalid_det_win_len defines the number of consecutive samples in the window (e.g., the length of the window) and can be a programmable register set during PHY configuration before the link comes up. At the time the detection window time reaches the given value of 1, an invalid detection event is triggered if the invalid number of samples exceeds a threshold. The invalid number of samples can be counted using invalid sample counter, invalid_det_cntr$_n$ as follows:

invalid_det_cntr$_n$=0 if invalid_det_en_dyn=FALSE;

invalid_det_cntr$_n$=1 if slicer_in_invalid$_n$ or 0 otherwise if win_cntr$_n$=1;

invalid_det_cntr$_n$=invalid_det_cntr$_{n-1}$+1 if slicer_in_invalid$_n$; and invalid_det_cntr$_n$=invalid_det_cntr$_{n-1}$ otherwise.

If invalid_det_cntr$_n$ reaches a programmable threshold value, defined by invalid_det_nsmpl, then an invalid level detection event is detected by the link loss detection module 110 and is indicated as the invalid_det$_n$ indication signal. Specifically, the link loss detection module 110 compares the value of invalid_det_cntr$_n$ to the invalid level detection threshold (invalid_det_nsmpl) to determine whether the number of samples within the window of samples that are invalid exceed a threshold and to trigger a signal indicating link loss in response.

FIG. 4c illustrates a situation in which the PHY receiver slicer 120 input signal first resolves a three level signal, followed by abrupt channel disruption and slicer input signal becoming 'stuck'. Specifically, FIG. 4c illustrates a fourth condition analyzed by the link loss detection module 110. FIG. 4c shows the slicer 120 input signal fixed at a level corresponding to one of the signal levels, e.g. −1, 0, +1. This scenario can be detected by the link loss detection module 110 when a sudden disruption to the channel (e.g., a wire break or short) interacts adversely with the operation of the channel equalizer. Equalization often employs feedback techniques, and it is possible that this can yield behavior similar to what is depicted in FIG. 4c in response to a sudden change in the channel response.

FIG. 4c illustrates the slicer input stuck at +1 level. This can be seen in the slicer input signal and would also be seen in the slicer output signal. To detect such a situation, the link loss detection module 110 monitors the slicer 120 output signal and determines that the slicer output signal is 'stuck', at least momentarily, if the following condition occurs wherein the two adjacent slicer output samples are equal to each other (e.g., slicer_out$_n$=slicer_out$_{n-1}$).

This detection function can be enabled by a programmable enable register, stuck_det_en. This may not change dynamically, rather, it can be set during PHY configuration, prior to establishment of the link, and would not be expected to change while the link is up. When this register is enabled, link loss detection module 110 performs the process of initializing a counter and, for each of the consecutive samples in a window of samples at the slicer input, determining whether two adjacent ones of the consecutive samples at the slicer output are equal to each other. The link loss detection module 110 decrements the counter in response to determining that the two adjacent ones of the consecutive samples at the slicer output are equal to each other. The link loss detection module 110 generates the signal indicating link loss in response to the counter matching the threshold. The link loss detection module 110 repeats this process and continuously monitors samples in a sliding window, where the counter is re-initialized for every new window of samples. In some embodiments, because the window is sliding, a certain number of samples from a previous window are analyzed again in the new window.

In some cases, this programmable enable register (e.g., stuck_det_en) does not change dynamically; rather, it is set during PHY configuration, prior to establishment of the link, and would not be expected to change while the link is up. Namely, prior to establishing the link, the link loss detection module 110 is configured to monitor a certain number and combination of conditions. These conditions that are monitored may not change after establishing the link.

In some embodiments, the detection function can be enabled dynamically (after the link is established) according to the value of stuck_det_en and other link parameters, including link status and local receiver status, as follows:

stuck_det_en_dyn=stuck_det_en*(link_status=OK)* (loc_rcvr_status=OK).

The purpose of including loc_rcvr_status is to handle LPI mode, where 0 levels would be expected for the slicer input samples during LPI QUIET.

The link loss detection module 110 generates the slicer stuck indication slicer_out_stuck$_n$, indication as follows:

slicer_out_stuck$_n$=FALSE if stuck_det_en_dyn=FALSE;

slicer_out_stuck$_n$=TRUE else if slicer_out$_n$=slicer_out$_{n-1}$; and slicer_out_stuck$_n$=FALSE else (slicer_out$_n$≠slicer_out$_{n-1}$).

The link loss detection module 110 determines whether a number of consecutive slicer output samples in a window of samples for which slicer_out_stuck$_n$ is TRUE exceeds a threshold. The number of consecutive slicer output samples against which the link loss detection module 110 determines whether the number of times the slicer_out_stuck$_n$ is TRUE can be set by a programmable register value, called stuck_det_nsmpl. The value here may consider the maximum possible number of consecutive zeros due to the coding scheme used by the PHY standard.

In some implementations, the link loss detection module 110 determines whether a number of consecutive slicer output samples (e.g., stuck_det_nsmpl) in a window of samples for which slicer_out_stuck$_n$ is TRUE by initializing a counter to a value of a threshold number of samples (stuck_det_nsmpl), decrementing a counter, stuck_det_cntr$_n$ and comparing the value of the counter to 0 (or another specified threshold) to determine whether a threshold number of samples, stuck_det_nsmpl, stuck at 0 were detected. For example, the counter can be decremented as follows:

stuck_det_cntr$_n$=stuck_det_nsmpl if stuck_det_en_dyn=FALSE;

stuck_det_cntr$_n$=stuck_det_cntr$_{n-1}$−1 else if slicer_out_stuck$_n$=TRUE; and stuck_det_cntr$_n$=stuck_det_nsmpl else (slicer_out_stuck$_n$=FALSE).

If stuck_det_cntr reaches 0, then slicer out stuck indication event is detected by the link loss detection module 110 and is flagged as the stuck_det$_n$ indication signal. The link loss detection module 110 repeats this process and continuously monitors samples in a sliding window, where the stuck_det_cntr$_n$ counter is re-initialized for every new window of samples. In some embodiments, because the window is sliding, a certain number of samples from a previous window are analyzed again in the new window.

Figure 5:
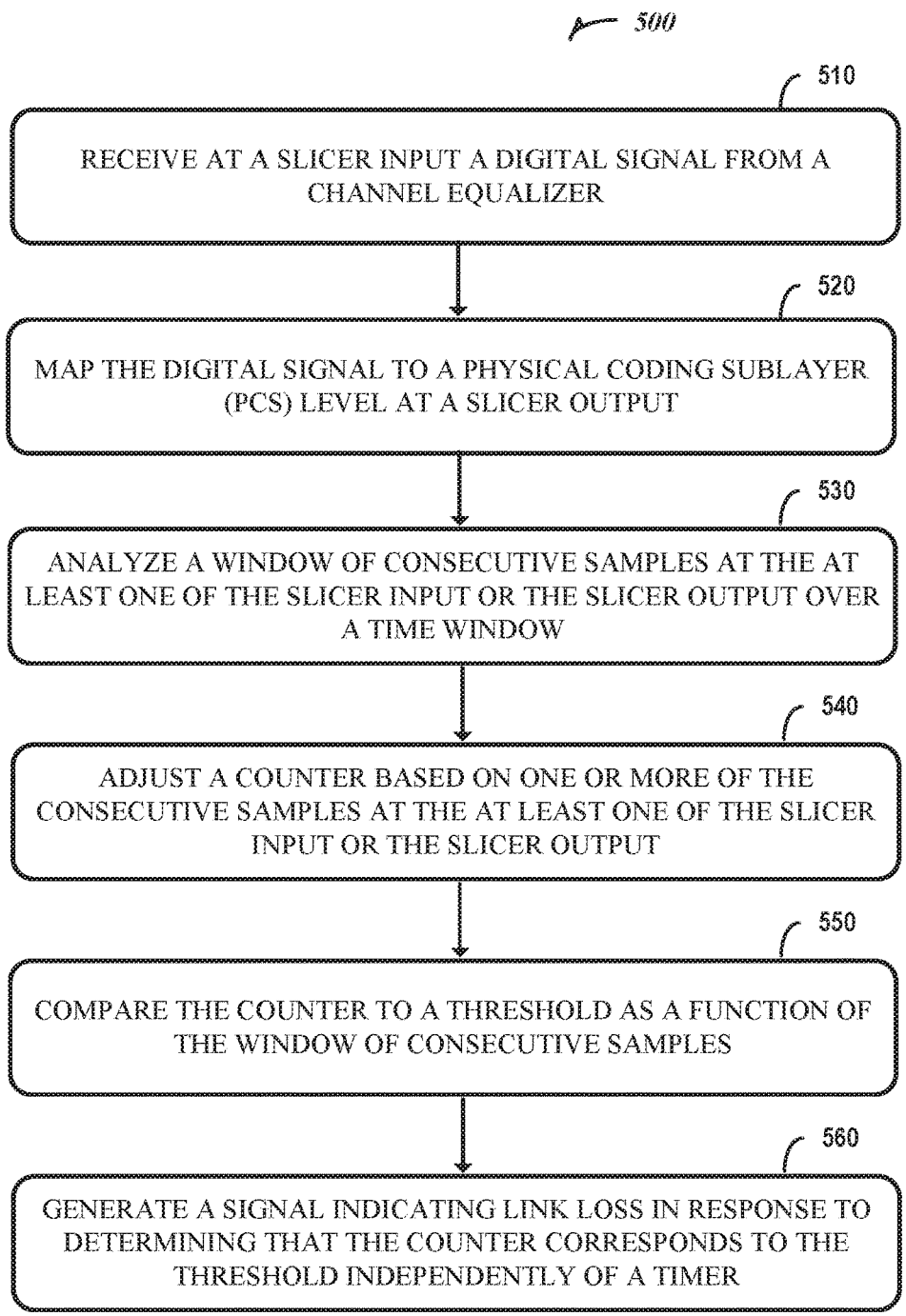
FIG. 5 is a flow diagram depicting example processes for performing link loss detection at a slicer, in accordance with various embodiments.

FIG. 5 is a flow diagram depicting an example process 500 for detecting link loss, in accordance with various embodiments. The operations of process 500 may be performed in parallel, in a different sequence, or may be entirely omitted. In some embodiments, some or all of the operations of process 500 may be embodied on a computer-readable medium and executed by one or more processors of a link loss detection module 110 and/or any other component of communications system 100 or 200 (FIGS. 1 and 2).

At operation 510, the slicer 120 receives, at a slicer input, a digital signal from a channel equalizer.

At operation 520, the slicer 120 maps the digital signal to a PCS level at a slicer output.

At operation 530, the link loss detection module 110 analyzes a window of consecutive samples at the at least one of the slicer input or the slicer output over a time window.

At operation 540, the link loss detection module 110 adjusts a counter based on one or more of the consecutive samples at the at least one of the slicer input or the slicer output.

At operation 550, the link loss detection module 110 compares the counter to a threshold as a function of the window of consecutive samples.

At operation 560, the link loss detection module 110 generates a signal indicating link loss in response to determining that the counter corresponds to the threshold independently of a timer.

The link loss detection functions discussed above in connection with link loss detection module 110 can be run in parallel and separately on all dimensions of the PHY receiver. If any of the detection function indications, near_zero_det$_n$, invalid_det$_n$, stuck_det$_n$, across any of the PHY receiver dimensions is TRUE, then the local receiver status is set accordingly to reflect the problem (e.g., by setting the loc_rcvr_status=NOT_OK) indicating that the PHY receiver is in a failed state.

Figure 6A:
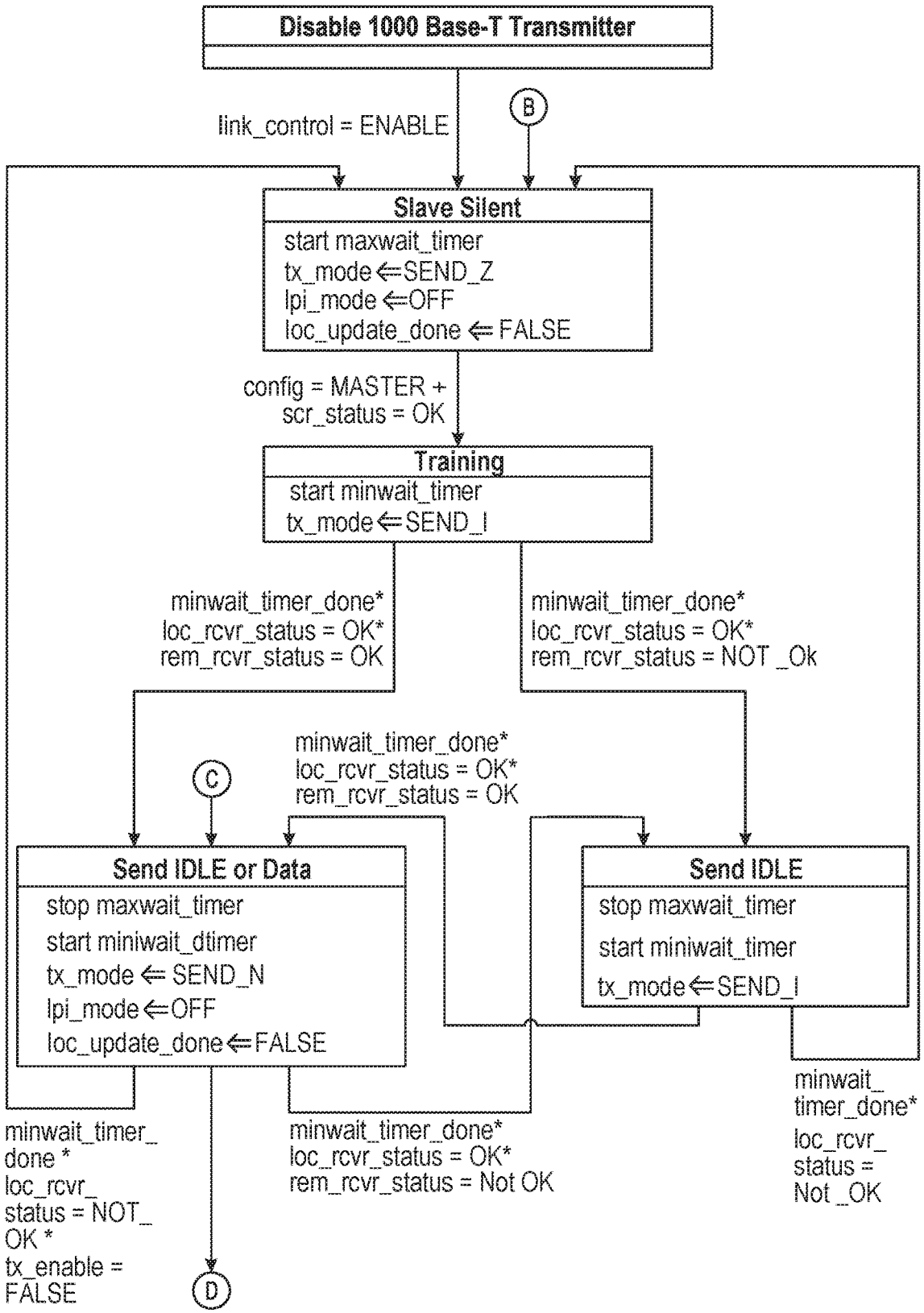
FIGS. 6a and 6b are illustrative PHY device and link monitor state diagrams employing the link loss detection module at a slicer, in accordance with various embodiments.
Figure 6A:
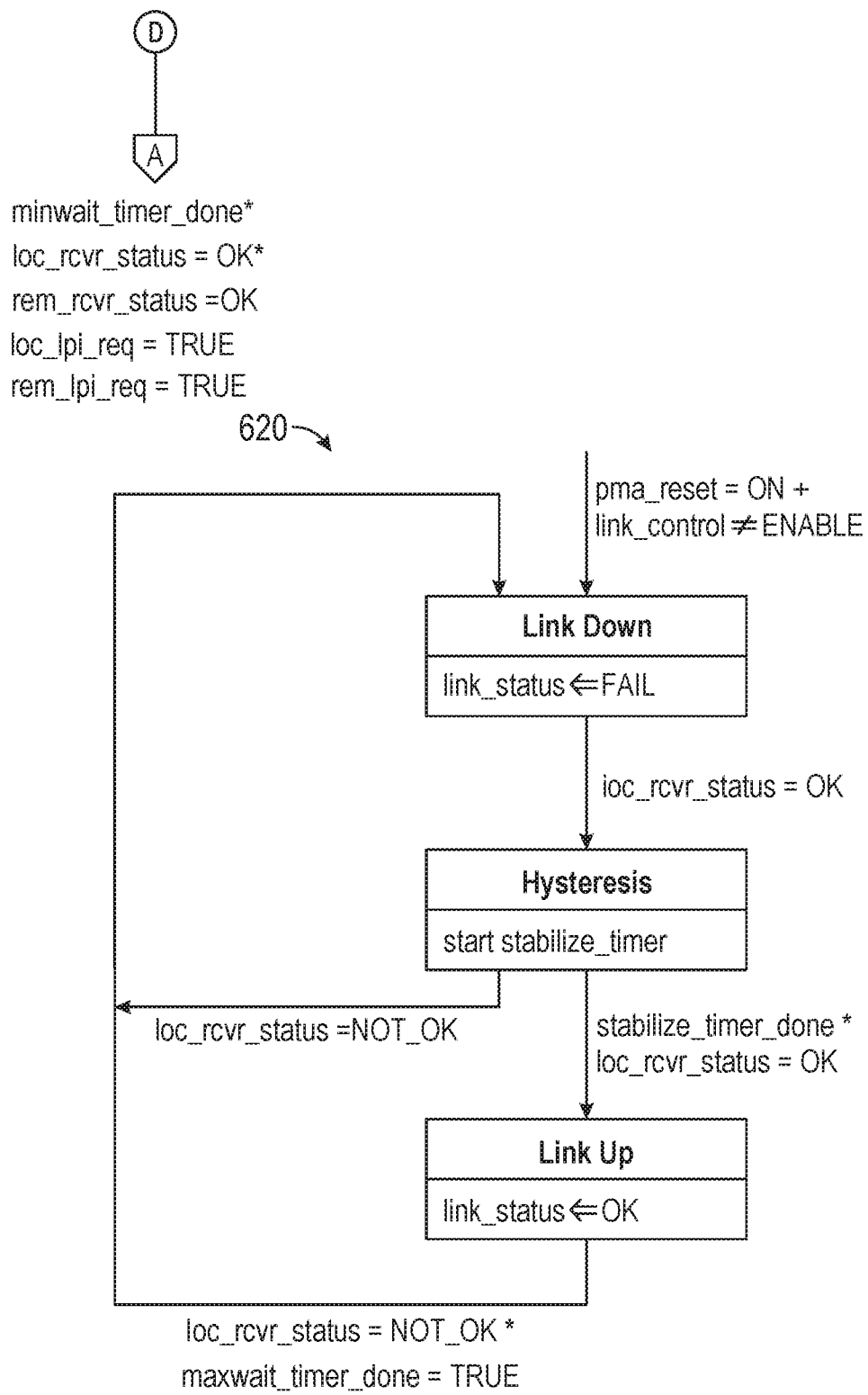
Figure 6B:
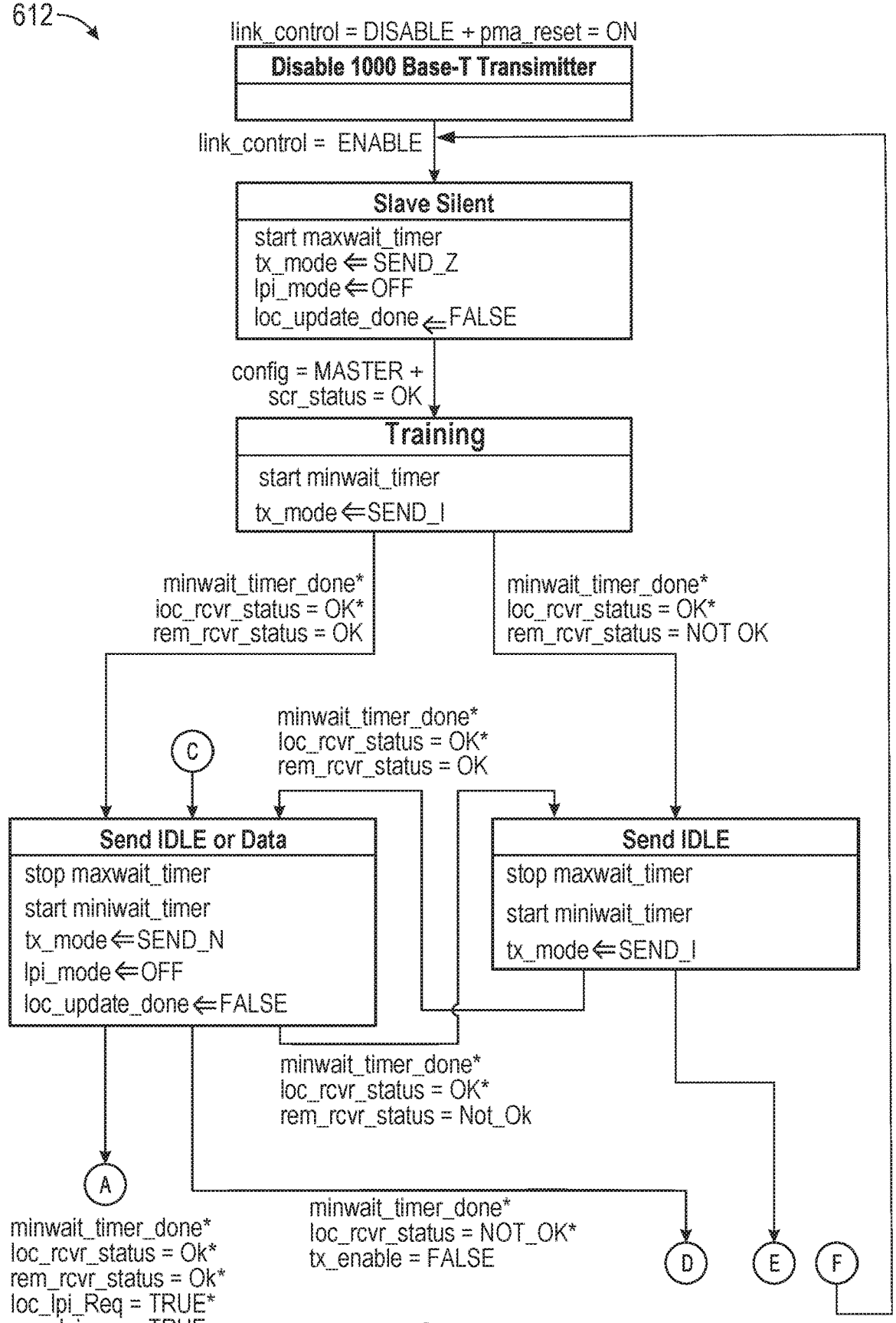
Figure 6B:
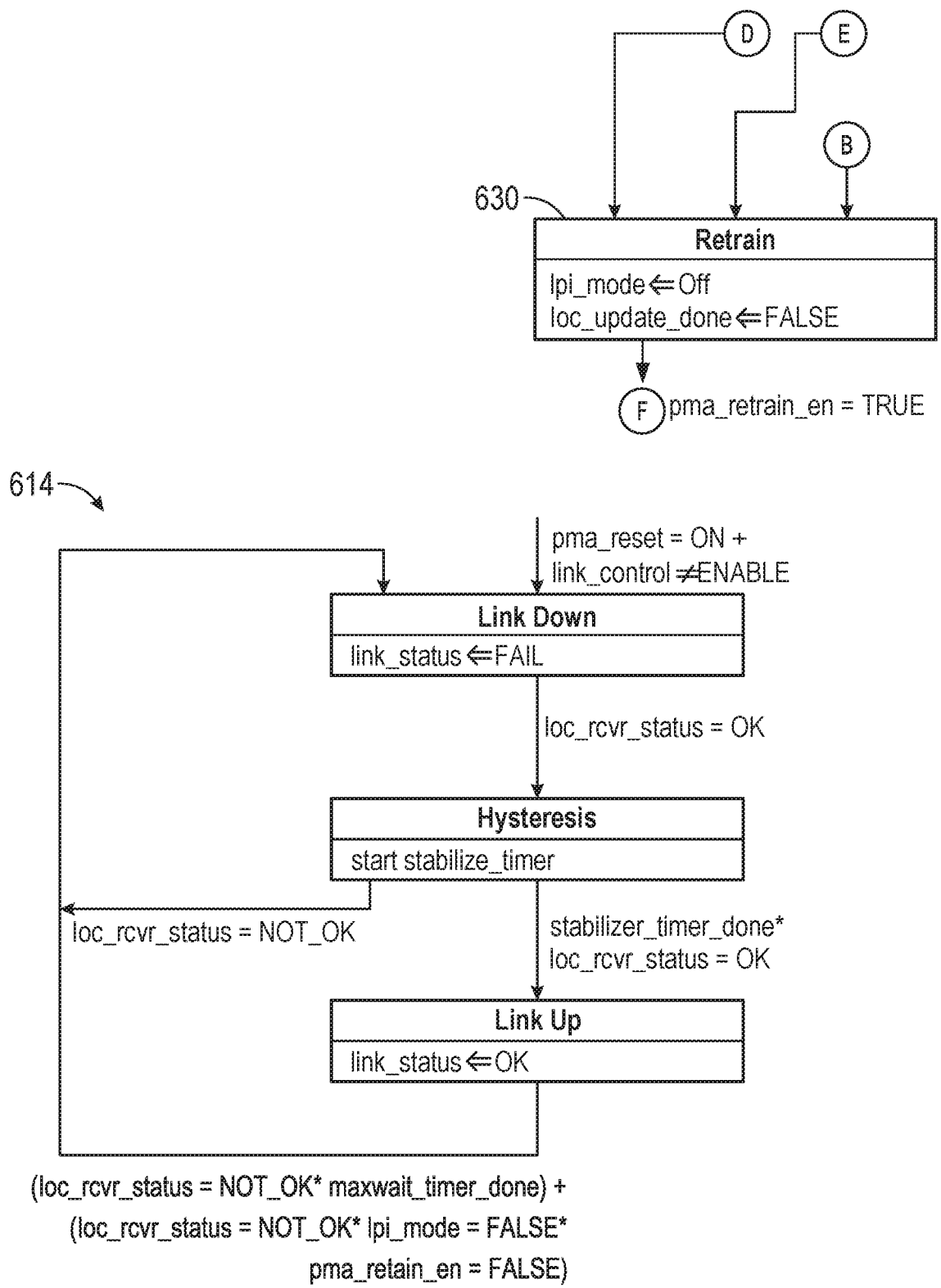

FIGS. 6a and 6b are illustrative PHY control and link monitor state diagrams employing the link loss detection module at a slicer, in accordance with various embodiments. PHY standards frequently include and mandate a 'retrain' behavior in circumstances where the PHY receiver indicates that the link has been lost. The disclosed examples pertain to retrain behavior of the 1000BASE-T PHY standard.

In 1000BASE-T, the PHY control state diagram 610 governs link startup as shown in FIG. 6a. The link startup process begins with a SLAVE SILENT state and ends in SEND IDLE OR DATA state after the link is established and is in a state where data can be transmitted and received. A maxwait_timer is started in the SLAVE SILENT state, and stopped in SEND IDLE OR DATA state, and so can be considered as a timer on the link startup process itself. Expiry of the maxwait_timer (maxwait_timer_done) has no effect on the PHY control state diagram 610; rather, it is used in the Link Monitor state diagram 620 shown in FIG. 6a.

The maxwait_timer_done is only used in the condition to transition from the LINK UP state to the LINK DOWN state when the PHY receiver has indicated incorrect operation (loc_rcvr_status=NOT_OK) (e.g., when the PHY receiver is in a failed state). This may only occur once the Link Monitor has entered the LINK UP state, where it indicates that the link is up by setting a link status register to link_status=OK. When the PHY receiver indicates incorrect operation by setting loc_rcvr_status=NOT_OK after the link has come up, PHY control promptly transitions back to SLAVE SILENT and commences a new link startup. This is the 'retrain' operation where the PHY receiver retrains its receiver to establish the link again. Also, when the PHY receiver indicates incorrect operation, the Link Monitor remains in the LINK UP state, asserting link_status=OK, until the maxwait_timer expires. It is only after the maxwait_timer expires when the link monitor transitions to the LINK DOWN state where the link status register is set to link_status=FAIL. As shown in state diagram 620, if the PHY receiver can return to normal operation (loc_rcvr_status=OK) before the maxwait_timer expires, then the Link Monitor will never indicate that the link was dropped because the retrain operations will have been successful.

If the PHY receiver cannot return to normal operation (maintaining loc_rcvr_state=NOT_OK) because a permanent disruption to the channel has occurred, then the Link Monitor will indicate that the link dropped after the maxwait_timer has expired. For 1000BASE-T, the maxwait_timer duration may be either 350 or 750 ms, depending on the PHY device MASTER/SLAVE configuration. As a result, any controlling agent or application that relies on and uses link_status provided by the link monitor to determine the status of the link may have to endure this poor signal condition for the duration of the maxwait_timer. Namely, even though the PHY receiver has been determined to be in a failed state, applications that rely on the output of the link monitor (particular the link status) to conduct communications may remain uninformed of the PHY receiver failure until the link monitor updates the link status after expiration of the maxwait_timer. Certain mission critical applications may suffer data loss and unrecoverable errors during this period of time. Such applications may need to be informed right away when the PHY receiver enters the failed state. Also, the Arbitration state machine of Auto-Negotiation as described in IEEE Std 802.3-2018 will be unaware that the PHY receiver has indicated incorrect operation for the duration of the retrain. The fact that the PHY receiver has indicated incorrect operation is not reported in link_status so as to prevent the Arbitration state machine from transitioning from FLP LINK GOOD to TRANSMIT DISABLE, where the link_control signal would be set to DISABLE, which would in turn prevent the PHY control state machine from performing the retrain.

A controlling agent or application aware of this issue may be configured to, instead of relying on the link status output of the link monitor, monitor the loc_rcvr_status, as well as rem_rcvr_status (the remote PHY device's version of loc_rcvr_status), that indicates that the PHY device is in the failed state in order to avoid having to wait the maxwait_timer duration before getting an indication of link loss. But such a configuration is not straightforward, especially if LPI mode functionality is active, because in such an LPI mode, the loc_rcvr_status may indicate that the local receiver is in a failed state or (loc_rcvr_status=NOT_OK) even though the link is still established. It does so because in low power operations, certain functionality of the PHY device is disabled and is briefly enabled periodically during REFRESH operations. Specifically, the LPI mode can be engaged when the PHY devices have no data frames to transmit, and the PHY device can enter the LPI QUIET state where the PHY transmitter is disabled and the link is de facto down and the PHY receiver might set loc_rcvr_status=NOT_OK during this state. A controlling agent or application that relies solely and directly on the loc_rcvr_status to determine that the link is up or down may thereby incorrectly determine the link to be down when the PHY device is in the LPI mode.

FIG. 6b illustrates an approach to address this issue and involves adding a control register bit to allow retrain functionality to be enabled or disabled. A pma_retrain_en register control bit in state 630 is introduced, which allows retrain functionality to be selectively enabled (or disabled). The pma_retrain_en register has two values: TRUE indicates that retrain is enabled while FALSE indicates that retrain is disabled. Applications that require full IEEE compliance may set the register pma_retrain_en=TRUE, in which upon determining that the PHY device has failed, the PHY device enters a retrain state in the SLAVE SILENT state and the link monitor does not indicate that the link is down until the maxwait_time duration expires. Applications (e.g., mission critical applications) which need immediate indication of link loss or that the link is down may set the register pma_retrain_en=FALSE. Such applications may need this indication as soon as a determination is made that the PHY device is in a failed state and do not need retrain functionality.

As shown in FIG. 6b, all retrain transitions in state diagram 612, e.g., transitions back to SLAVE SILENT in the PHY control state diagram 610 (FIG. 6a), now go to a new RETRAIN state 630. Namely, in response to a determination that the PHY device is in a failed state (e.g., when the link loss detection module 110 determines that one or more link loss conditions have been satisfied in which the loc_rcvr_status=NOT_OK), the PHY device transitions from the SEND IDLE OR DATA state to the RETRAIN state 630. The state machine stays in the RETRAIN state 630 if pma_retrain_en=FALSE, thereby preventing the PHY device from attempting to re-establish the link, and only proceeds back to SLAVE SILENT if pma_retrain_en=TRUE.

If pma_retrain_en=TRUE, behavior matches that of the PHY control state diagram 610 (FIG. 6a) in which the PHY device proceeds to the SLAVE SILENT state to attempt to re-establish the link and the link monitor waits for the maxwait_timer to expire before indicating to the controlling agent or application that the link is down. In certain embodiments, depending on the setting of the pma_retrain_en register, the link loss detection module 110 provides different signals. For example, if the register pma_retrain_en=TRUE, the link loss detection module 110 may analyze the samples on the link to determine whether one or more conditions are satisfied. If the one or more conditions are satisfied, the link loss detection module 110 may indicate that the PHY device is in a failed state by setting the loc_rcvr_status=NOT_OK and cause the PHY device to proceed to the SLAVE SILENT state and for the link monitor to wait for the maxwait_timer to expire before generating a link down signal.

As another example, if the register pma_retrain_en=FALSE, the link loss detection module 110 may analyze the samples on the link to determine whether one or more conditions are satisfied. If the one or more conditions are satisfied, the link loss detection module 110 may indicate that the PHY device is in a failed state by setting the loc_rcvr_status=NOT_OK and cause the PHY device to proceed to the RETRAIN state 630 and remain in that state until a reset signal is received from the controlling agent or application. Also, the link loss detection module 110 may cause the link monitor to immediately transition to the LINK DOWN state to generate a link down signal to the controlling agent or application without waiting for the maxwait_timer to expire (assuming the PHY device is not in the LPI mode). In some implementations, where retrain is disabled (e.g., pma_retrain_en=FALSE), the system may indicate prompt/immediate link loss to the upper layers (link_status=FAIL) in response to observing the internal link loss signal (loc_rcvr_status=NOT_OK).

Specifically, the Link Monitor is modified in FIG. 6b so that it transitions back to LINK DOWN immediately, without waiting for maxwait_timer_done, if pma_retrain_en=FALSE. As shown in state diagram 614, when pma_retrain_en=FALSE, the state machine does not wait for maxwait_timer_done (e.g., does not wait for the period of time allowed for the PHY device to bring a link up or re-establish the link); rather, it proceeds immediately to the LINK DOWN state when loc_rcvr_status=NOT_OK. The condition for this transition may also require lpi_mode=FALSE to avoid incorrectly indicating link loss when the PHY link is operating in the LPI mode.

A pma_disable signal (not shown) may also be introduced to indicate that link training has restarted. The condition pma_disable=TRUE may only occur when the PMA receiver has been disabled (reset) and training will fully restart.

Figure 7:
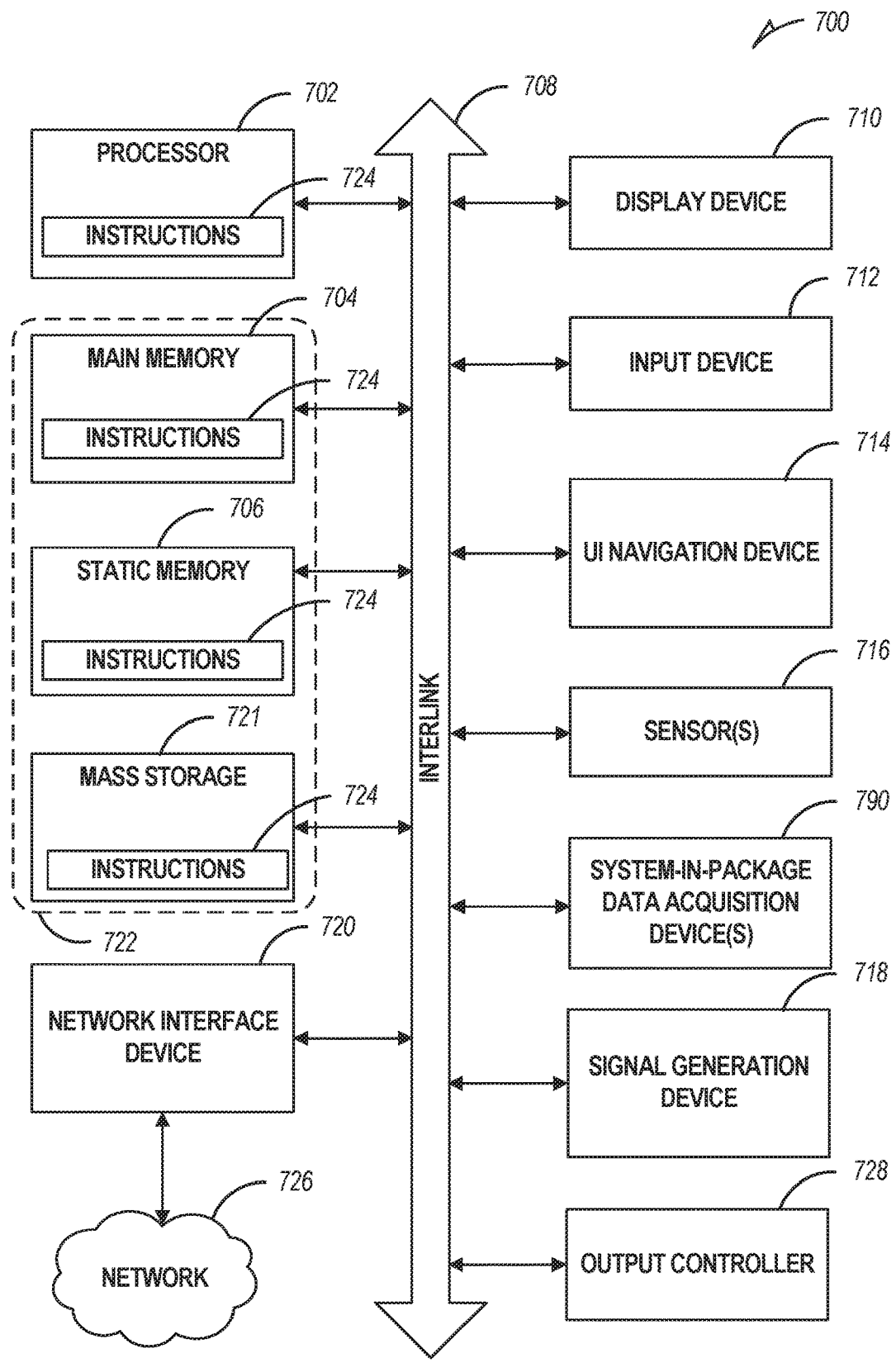
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, an IoT device, automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 700 may include a hardware processor 702 (e.g., a central processing unit (CPU), a graphics processing unit (GPU), a hardware processor core, or any combination thereof, such as a memory controller, etc.), a main memory 704, and a static memory 706, some or all of which may communicate with each other via an interlink (e.g., bus) 708. The machine 700 may further include a display device 710, an alphanumeric input device 712 (e.g., a keyboard), and a user interface (UI) navigation device 714 (e.g., a mouse). In an example, the display device 710, input device 712, and UI navigation device 714 may be a touch screen display. The machine 700 may additionally include a storage device 721 (e.g., drive unit), a signal generation device 718 (e.g., a speaker), a network interface device 720, one or more sensors 716, such as a global positioning system (GPS) sensor, wing sensors, mechanical device sensors, temperature sensors, ICP sensors, bridge sensors, audio sensors, industrial sensors, compass, accelerometer, or other sensor, and one or more system-in-package data acquisition device(s) 790. System-in-package data acquisition device(s) 790 may implement some or all of the functionality of system-in-package data acquisition device(s) 100. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 722 may include a machine-readable medium on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 721 may constitute the machine-readable medium 722.

While the machine-readable medium 722 is illustrated as a single medium, the term "machine-readable medium" may include a single medium or multiple media (e.g., a centralized or distributed database, or associated caches and servers) configured to store the one or more instructions 724.

The term "machine readable medium" may include any transitory or non-transitory medium that is capable of storing, encoding, or carrying transitory or non-transitory instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 (e.g., software, programs, an operating system (OS), etc.) or other data that are stored on the storage device 721 can be accessed by the memory 704 for use by the processor 702. The memory 704 (e.g., DRAM) is typically fast, but volatile, and thus a different type of storage than the storage device 721 (e.g., an SSD), which is suitable for long-term storage, including while in an "off" condition. The instructions 724 or data in use by a user or the machine 700 are typically loaded in the memory 704 for use by the processor 702. When the memory 704 is full, virtual space from the storage device 721 can be allocated to supplement the memory 704; however, because the storage device 721 is typically slower than the memory 704, and write speeds are typically at least twice as slow as read speeds, use of virtual memory can greatly reduce user experience due to storage device latency (in contrast to the memory 704, e.g., DRAM). Further, use of the storage device 721 for virtual memory can greatly reduce the usable lifespan of the storage device 721.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding or carrying instructions for execution by the machine 700, and includes digital or analog communications signals or other tangible or intangible medium to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in an aspect are still deemed to fall within the scope of that aspect. Moreover, in the following aspects, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly language code, a higher-level language code, or the like. Such code may include transitory or non-transitory computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments may be combined with each other in various combinations or permutations. The scope of the inventive subject matter should be determined with reference to the appended aspects, along with the full scope of equivalents to which such aspects are entitled.

What is claimed is:

1. A system for detecting link loss in a physical layer receiver of a communication system, the system comprising:
   a slicer coupled to receive at a slicer input a digital signal from a channel equalizer and map the digital signal to a physical coding sublayer (PCS) level at a slicer output; and
   a processor coupled to at least one of the slicer input or the slicer output and configured to:
      analyze a window of consecutive samples at the at least one of the slicer input or the slicer output over a time window;
      adjust a counter based on one or more of the consecutive samples at the at least one of the slicer input or the slicer output;
      compare the counter to a threshold as a function of the window of consecutive samples; and
      generate a signal indicating link loss in response to determining that the counter corresponds to the threshold independently of a timer.

2. The system of claim 1, wherein the PCS comprises three levels; and
   wherein the slicer is configured to map the digital signal to one of the three levels.

3. The system of claim 1, wherein the signal indicating link loss comprises a near zero detection event signal, wherein the threshold is zero; and
   wherein the processor is further configured to:
      initialize the counter to a non-zero value;
      for each of the consecutive samples at the slicer input:
         compute an absolute value of a given sample of the consecutive samples at the slicer input;
         compare the computed absolute value of the given sample to a near zero detection level; and
         decrement the counter in response to determining that the computed absolute value of the given sample is less than or equal to the near zero detection level, wherein the signal is generated in response to the counter matching the threshold; and
      re-initialize the counter to the non-zero value after processing each of the consecutive samples and in response to determining that at least one of the computed absolute values is greater than the near zero detection level.

4. The system of claim 1, wherein the signal indicating link loss comprises a near zero detection event signal, wherein the threshold is a non-zero value; and
wherein the processor is further configured to:
initialize the counter to a zero value;
for each of the consecutive samples at the slicer input:
compute an absolute value of a given sample of the consecutive samples at the slicer input;
compare the computed absolute value of the given sample to a near zero detection level; and
increment the counter in response to determining that the computed absolute value of the given sample is less than or equal to the near zero detection level, wherein the signal is generated in response to the counter matching the threshold; and
re-initialize the counter to the zero value after processing each of the consecutive samples and in response to determining that at least one of the computed absolute values is greater than the near zero detection level.

5. The system of claim 1, wherein the signal indicating link loss comprises an invalid level detection event signal; and
wherein the processor is further configured to:
initialize the counter to a zero value;
for each of the consecutive samples at the slicer input:
compute an absolute value of a difference between a value of a given sample of the consecutive samples at the slicer input and a value of the given sample at the slicer output;
compare the computed absolute value of the given sample to an invalid detection level; and
increment the counter in response to determining that the computed absolute value of the given sample is greater than the invalid detection level, wherein the signal is generated in response to the counter exceeding the threshold; and
periodically re-initialize the counter to the zero value for a subsequent window of consecutive samples.

6. The system of claim 1, wherein the signal indicating link loss comprises an invalid level detection event signal; and
wherein the processor is further configured to:
initialize the counter to the threshold;
for each of the consecutive samples at the slicer input:
compute an absolute value of a difference between a value of a given sample of the consecutive samples at the slicer input and a value of the given sample at the slicer output;
compare the computed absolute value of the given sample to an invalid detection level; and
decrement the counter in response to determining that the computed absolute value of the given sample is greater than the invalid detection level, wherein the signal is generated in response to the counter reaching zero; and
periodically re-initialize the counter to the threshold for a subsequent window of consecutive samples.

7. The system of claim 1, wherein the signal indicating link loss comprises a stuck detection event signal, wherein the threshold is zero; and
wherein the processor is further configured to:
initialize the counter to a non-zero value;
for each of the consecutive samples at the slicer input:
determine whether two adjacent ones of the consecutive samples at the slicer output are equal to each other; and
decrement the counter in response to determining that the two adjacent ones of the consecutive samples at the slicer output are equal to each other, wherein the signal is generated in response to the counter matching the threshold; and
re-initialize the counter to the non-zero value after processing each of the consecutive samples and in response to determining that at least one pair of two adjacent consecutive samples are different from each other.

8. The system of claim 1, wherein the signal indicating link loss comprises a stuck detection event signal, wherein the threshold is a non-zero value; and
wherein the processor is further configured to:
initialize the counter to a zero value;
for each of the consecutive samples at the slicer input:
determine whether two adjacent ones of the consecutive samples at the slicer output are equal to each other; and
increment the counter in response to determining that the two adjacent ones of the consecutive samples at the slicer output are equal to each other, wherein the signal is generated in response to the counter matching the threshold; and
re-initialize the counter to the zero after processing each of the consecutive samples and in response to determining that at least one pair of two adjacent consecutive samples are different from each other.

9. The system of claim 1; wherein the processor is further configured to wait for a reset signal before retraining a link in response to the signal indicating the link loss.

10. The system of claim 9, wherein the processor is further configured to:
determine whether retraining is enabled or disabled;
in response to determining that retraining has been disabled, wait for the reset signal and prevent starting the timer for retraining the link in response to detecting the signal indicating the link loss; and
in response to determining that retraining has been enabled:
retrain the link without waiting for the reset signal; and
generate the signal indicating link loss after the timer expires.

11. The system of claim 9, wherein the processor is further configured to:
determine whether retraining is enabled or disabled; and
in response to determining that retraining has been disabled and in response to detecting the signal indicating the link loss, immediately and without waiting for expiration of the timer, indicate to a controlling agent or application the link loss.

12. A method comprising:
receiving at a slicer input a digital signal from a channel equalizer;
mapping the digital signal to a physical coding sublayer (PCS) level at a slicer output;
analyzing a window of consecutive samples at the slicer input or the slicer output over a time window;
adjusting a counter based on one or more of the consecutive samples at the slicer input or the slicer output;
comparing the counter to a threshold as a function of the window of consecutive samples; and
generating a signal indicating link loss in response to determining that the counter corresponds to the threshold independently of a timer.

13. The method of claim 12, wherein the PCS comprises three levels; and wherein the slicer is configured to map the digital signal to one of the three levels.

14. The method of claim 12, wherein the signal indicating link loss comprises a near zero detection event signal, wherein the threshold is zero, further comprising:
   initializing the counter;
   for each of the consecutive samples at the slicer input:
      computing an absolute value of a given sample of the consecutive samples at the slicer input;
      comparing the computed absolute value of the given sample to a near zero detection level; and
      decrementing the counter in response to determining that the computed absolute value of the given sample is less than or equal to the near zero detection level, wherein the signal is generated in response to the counter matching the threshold; and
   re-initialize the counter after processing each of the consecutive samples and in response to determining that at least one of the computed absolute values is greater than the near zero detection level.

15. The method of claim 12, wherein the signal indicating link loss comprises an invalid level detection event signal, further comprising:
   initializing the counter;
   for each of the consecutive samples at the slicer input:
      computing an absolute value of a difference between a value of a given sample of the consecutive samples at the slicer input and a value of the given sample at the slicer Output;
      comparing the computed absolute value of the given sample to an invalid detection level; and
      incrementing the counter in response to determining that the computed absolute value of the given sample is greater than the invalid detection level, wherein the signal is generated in response to the counter exceeding the threshold; and
   periodically re-initialize the counter for a subsequent window of consecutive samples.

16. The method of claim 12, wherein the signal indicating link loss comprises a stuck detection event signal, wherein the threshold is zero, further comprising:
   initializing the counter;
   for each of the consecutive samples at the slicer input:
      determining whether two adjacent ones of the consecutive samples at the slicer output are equal to each other; and
      decrementing the counter in response to determining that the two adjacent ones of the consecutive samples at the slicer output are equal to each other, wherein the signal is generated in response to the counter matching the threshold; and
   re-initialize the counter after processing each of the consecutive samples and in response to determining that at least one pair of two adjacent consecutive samples are different from each other.

17. The method of claim 12, further comprising waiting for a reset signal before retraining a link in response to the signal indicating the link loss.

18. The method of claim 17, further comprising:
   determining whether retraining is enabled or disabled;
   in response to determining that retraining has been disabled, waiting for the reset signal and preventing starting the timer for retraining the link in response to detecting the signal indicating the link loss; and
   in response to determining that retraining has been enabled:
      retraining the link without waiting for the reset signal; and
      generating the signal indicating link loss after the timer expires.

19. An apparatus comprising:
   means for receiving at a slicer input a digital signal from a channel equalizer;
   means for mapping the digital signal to a physical coding sublayer (PCS) level at a slicer output;
   means for analyzing a window of consecutive samples at the slicer input or the slicer output over a time window;
   means for adjusting a counter based on one or more of the consecutive samples at the slicer input or the slicer output;
   means for comparing the counter to a threshold; and
   means for generating a signal indicating link loss in response to determining that the counter corresponds to the threshold independently of a timer.

20. The apparatus of claim 19, wherein the PCS comprises three levels; and
   wherein the slicer is configured to map the digital signal to one of the three levels.

* * * * *

UNITED STATES PATENT AND TRADEMARK OFFICE
CERTIFICATE OF CORRECTION

PATENT NO. : 10,785,069 B2  
APPLICATION NO. : 16/684257  
DATED : September 22, 2020  
INVENTOR(S) : Fitzgerald et al.

Page 1 of 1

It is certified that error appears in the above-identified patent and that said Letters Patent is hereby corrected as shown below:

In the Claims

In Column 20, Line 29, in Claim 9, delete "claim 1;" and insert --claim 1,-- therefor In Column 21, Line 29, in Claim 15, delete "Output;" and insert --output;-- therefor Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*